July 29, 1958   N. A. KOSS   2,845,582
ELECTRONIC CONTROL RELAY
Filed Dec. 30, 1954
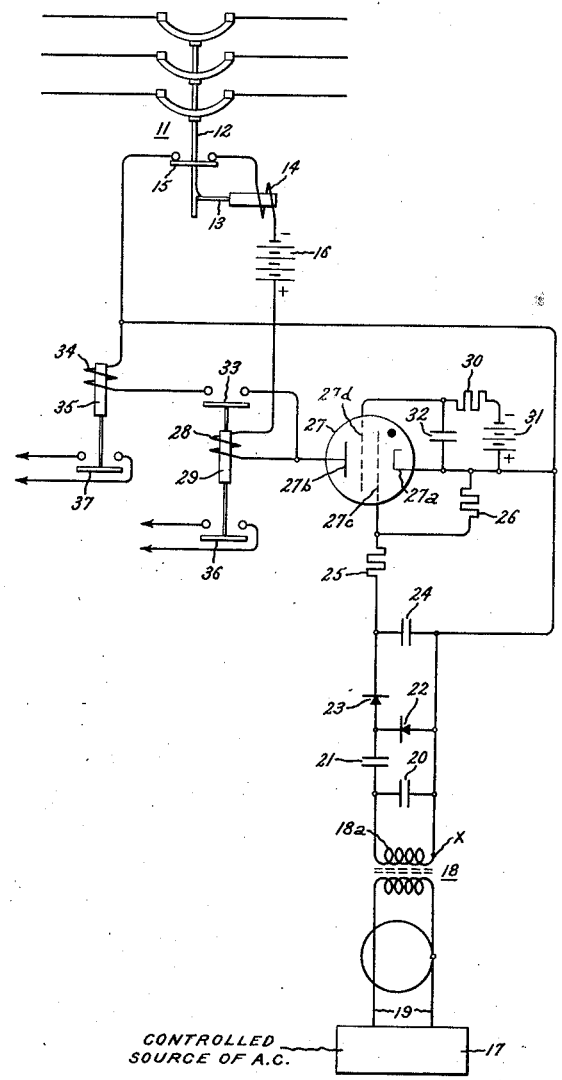
Inventor:
Norman A. Koss,
by J. Wesley Saubrier
His Attorney.

United States Patent Office 2,845,582
Patented July 29, 1958

2,845,582
ELECTRONIC CONTROL RELAY

Norman A. Koss, Philadelphia, Pa., assignor to General Electric Company, a corporation of New York Application December 30, 1954, Serial No. 478,761

3 Claims. (Cl. 317—51)

This invention relates to an electronic control relay, and more particularly to an extremely high speed relay which utilizes a gaseous discharge type electric valve to perform preselected control operations.

In many relay arrangements it is highly desirable to operate certain electroresponsive devices in extremely rapid response to a control signal of unidirectional or alternating voltage. For example, in a fault responsive protective system for an electric power transmission line such as described and claimed in copending patent applications S. N. 469,947, filed on November 19, 1954, by Merwyn E. Hodges and Norman A. Koss, and S. N. 473,802, filed on December 8, 1954, by Harold T. Seeley, Merwyn E. Hodges and Norman A. Koss, both said copending applications being assigned to the present assignee, alternating voltage of predetermined amplitude is produced whenever a fault occurs on the protected transmission line, and in response thereto an auxiliary tripping unit (TX) must immediately energize the trip coil of a transmission line circuit breaker. Accordingly, it is an object of this invention to provide an extremely high speed control relay for energizing an electroresponsive device substantially instantaneously in response to predetermined control voltage.

It is a further object of this invention to provide a control relay utilizing a gaseous discharge electric valve for performing a series of preselected control operations in extremely rapid response to alternating voltage of predetermined amplitude.

Still another object of this invention is to provide a reliable electronic control relay which responds consistently to a predetermined value of control voltage regardless of transient voltage disturbances or supply voltage fluctuations.

Another object of this invention is to provide an electronic control relay operable in response to a predetermined voltage signal to perform a plurality of control operations dependent upon operation of said control relay.

In carrying my invention into effect in one form thereof, a gaseous discharge type of electric valve having an anode, a cathode, a control grid and a shield grid is provided together with means for supplying to the control grid a positive unidirectional control voltage and to the shield grid a unidirectional negative bias voltage of sufficient magnitude to prevent the valve from conducting for values of control voltage less than a predetermined critical value. For values of control voltage in excess of such critical value, the valve becomes conducting, and means responsive to its conduction are provided for initiating a desired control operation.

In one aspect of the invention, the positive control voltage is derived from alternating voltage which is produced in response to the occurrence of a fault on an electric power transmisison line. Such alternating voltage is stepped-up by a transformer, rectified by a voltage doubler, smoothed by a filter capacitor, and supplied to the control grid of the valve to counteract the negative bias of the shield grid and thereby initiate conduction. Such conduction is utilized to effect a control operation such, for example, as energizing the trip coil of a circuit breaker. It is also utilized to perform certain additional switching operations, such as effecting operation of an electromagnetic switching device to terminate conduction by the valve, and to effect operation of another switching device to initiate certain additional auxiliary control operations.

My invention will be better understood and further objects and advantages will be apparent from the following description taken in conjunction with the accompanying drawing which is a schematic diagram of a control circuit embodying a preferred form of my invention.

Referring now to the drawing, I have shown by way of example a 3-pole circuit breaker 11 including a movable switch member 12 which is held by a latch 13 in its closed circuit position. Energization of an electroresponsing device such as a trip coil 14 actuates latch 13 thereby releasing switch member 12 for rapid circuit interrupting movement. An auxiliary contact 15 is opened during circuit interrupting movement of switch member 12. A source of unidirectional supply voltage 16, which has been represented in the drawing by way of illustration as a battery, provides the relatively large magnitude of direct current, such as 30 amperes, required to energize trip coil 14. The illustrated circuit breaker might be employed, for example, at one terminal of a 3-phase high voltage electric power transmission line, and an indication to trip this circuit breaker might be furnished by suitable protective relays such as those described and claimed in the above mentioned copending applications S. N. 469,947 and S. N. 473,802. The source of tripping indication is preferably a source of controlled alternating voltage which, in the drawing, is conventionally represented by the block 17. It is intended that source 17 represent any suitable means for producing an alternating voltage control signal whenever tripping of circuit breaker 11 is desired. Preferably the control signal alternates at a high frequency, since this reduces the response time of the control relay. Source 17 might represent, for example, the auxiliary relay (OSC) described and claimed in a copending application S. N. 471,593, filed on November 29, 1954, by Merwyn E. Hodges, and assigned to the present assignee. The control signal from source 17 is supplied to the novel electronic control relay hereinafter described.

In the illustrated embodiment of the electronic control relay, suitable transforming means, such as a powdered iron core transformer 18, is coupled to source 17 by coaxial cable 19. A coaxial cable 19 is used to substantially eliminate the possibility of undesirable voltage being induced in the conductors between source 17 and transformer 18 by stray electric fields intersecting these conductors. Transformer 18 serves as a means for D. C. isolation between source 17 and the succeeding control relay circuits. Transformer 18 also steps-up the voltage of the control signal thereby developing across its secondary winding 18a an amplified alternating voltage having greater amplitude than the voltage produced by source 17. A capacitor 20 is connected across transformer secondary winding 17a to form therewith a parallel LC tuned circuit whereby the impedance of coaxial cable 19 and source 17 is matched by the impedance of transformer 18. In this manner optimum electric energy is transferred from source 17 to the control relay. One terminal of transformer secondary winding 18a, which terminal is designated by the letter X, is connected through auxiliary contact 15 and trip coil 14 of circuit breaker 11 to the negative terminal of battery 16.

The amplified control signal is supplied from transformer secondary winding 18a to a voltage-doubler arrangement which includes a coupling capacitor 21, a shunt rectifier 22 connected between capacitor 21 and terminal X of secondary winding 18a, and a blocking rectifier 23 connected in series circuit relationship with a filter capacitor 24 across shunt rectifier 22 as shown in the drawing. A voltage substantially equal to the peak-to-peak value of the amplified alternating voltage is developed by this circuit across load resistance comprising two resistors 25 and 26 connected in series circuit relationship across filter capacitor 24. During a negative half cycle of the alternating voltage, with respect to terminal X, shunt rectifier 22 conducts current which charges coupling capacitor 21 by an amount substantially equal to the peak value of the half cycle of voltage. During the succeeding positive half cycle, blocking rectifier 23 conducts current and filter capacitor 24 is charged to a voltage level determined by the charge accumulated on capacitor 21 during the preceeding negative half cycle plus the peak value of the positive half cycle of voltage. Thus, filter capacitor 24 is charged to a voltage level substantially equal to twice the peak value of amplified alternating voltage. This unidirectional voltage is applied to the load resistance, blocking rectifier 23 preventing the discharge of filter capacitor 24 back into coupling capacitor 21 during the next negative half cycle. The resistance of resistor 26 is much greater than that of resistor 25, and the resulting large unidirectional voltage drop across resistor 26 comprises a positive polarity control signal which is applied to a control grid 27c of a gaseous discharge type electric valve to be described below. Filter capacitor 24 is relatively insensitive to transient voltages of short duration and thereby prevents adverse transient disturbances to the magnitude of control signal. Although in the illustrated embodiment of my invention I have shown the above described means to convert an alternating voltage control signal to a unidirectional voltage control signal, it should be pointed out that a unidirectional voltage control signal of suitable magnitude could be supplied directly by whatever means is employed to furnish a tripping indication.

A tetrode gaseous discharge type electric valve 27 is provided as shown in the drawing. This valve, which may for example comprise a heavy duty thyratron 3D22, has a cathode 27a, a plate or anode 27b, a control grid 27c and a shield grid 27d. The cathode heater and heater circuit, being well known to those skilled in the art, have been omitted for the sake of drawing simplicity. Cathode 27a is connected directly to terminal X of transformer secondary winding 18a thereby establishing cathode 27a as a reference point for the positive polarity control signal. Plate 27b of tube 27 is connected through an operating coil 28 of an electromagnetic seal-in switching device 29 to the positive terminal of battery 16. Thus the trip coil 14 of circuit breaker 11, which in series with the auxiliary contact 15 is connected between the negative terminal of battery 16 and terminal X of winding 18a, is disposed in a circuit controlled by the electric valve 27. Whenever valve 27 is triggered the valve will fire and tripping current will flow from the positive terminal of battery 16 through operating coil 28, through valve 27, and from cathode 27a through auxiliary contact 15 and trip coil 14 to the negative terminal of battery 16. In this manner trip coil 14 is energized by direct current from battery 16 and circuit breaker 11 is tripped.

To insure correct operation of the control relay, it is necessary to prevent conduction or firing by valve 27 until a control signal of substantial magnitude is developed. A conventional method of controlling the critical magnitude of voltage required to fire a negative controlled tetrode gaseous discharge valve is to provide a negative bias voltage between cathode and control grid. However, this method would require a large bias battery. In my invention I am able to employ a relatively small bias voltage, preferably supplied by a battery, by using the shield grid potential to determine the magnitude of triggering voltage. As can be seen in the drawing, shield grid 27d of tube 27 is connected through a resistor 30 and an independent source of unidirectional bias voltage represented by battery 31 to cathode 27a. The resistor 30 and bias battery 31 comprise a bias circuit, and battery 31 is poled to render the potential of the shield grid negative with respect to cathode. This bias voltage prevents conduction or firing by tube 27 until the control signal, which is the voltage on control grid 27c with respect to cathode, exceeds a predetermined critical positive value. The shield grid in a typical thyratron is located closer to both plate and cathode than the control grid and thereby dominates the potential distribution throughout the valve. Therefore, said predetermined critical value of control signal must be much greater than the magnitude of bias voltage to counteract or neutralize the bias effect and trigger the valve. For example, with 125 volts from supply battery 16 on plate 27b and with a five volt bias on shield grid 27d, a control signal of 80 volts is required to trigger valve 27. While valve 27 is non-conductive, no current flows through the shield grid circuit, and therefore a reliable, low-drain, long-life type of battery may be used for bias battery 31. Resistor 30 limits current flowing in the bias circuit while valve 27 is firing. An energy storing circuit such as capacitor 32 is connected in parallel with the source of bias voltage between shield grid 27d and cathode 27a to prevent adverse disturbance of the shield grid voltage. Without capacitor 32, a sudden change in the supply voltage of battery 16 could cause the magnitude of shield grid voltage to momentarily decrease and permit valve 27 to fire.

Resistor 26 is connected between control grid 27c and cathode 27a. This resistor provides a direct current path from control grid 27c to cathode 27a and thereby prevents control grid 27c from floating positive while no control signal is present. The large unidirectional voltage or control signal across resistor 26 is greater than the predetermined value of voltage required to trigger valve 27, and in response to the presence of this signal valve 27 will immediately start conduction in a manner well known to those skilled in the art. Resistor 25 is provided to limit control grid current while valve 27 is firing. This resistor also provides a desirable means for limiting the loading effect of valve 27 on the control signal. Other similar electronic control relays may be operated in parallel with the one illustrated in the drawing, and therefore it is necessary to prevent draining of the entire common control signal by the loading requirements of only one gaseous discharge valve. When valve 27 fires, the control signal will be maintained across resistor 25.

Conduction of tripping current by valve 27 operably energizes both the trip coil 14 of circuit breaker 11 and the seal-in switching device 29. When device 29 operates, a seal-in contact 33 completes a shunt circuit around valve 27, and as a result the plate to cathode voltage of valve 27 becomes substantially zero and conduction by valve 27 is terminated. The shunt path includes an operating coil 34 of a second electromagnetic switching device 35, and device 35 is energized by the tripping current which follows this shunt path while maintaining trip coil 14 energized. As switch member 12 of circuit breaker 11 moves to its open circuit position, auxiliary contact 15 opens to interrupt the tripping current and deenergize both devices 29 and 35. Upon removal of the control signal supplied by source 17 and upon closing of circuit breaker 11, the control relay is completely reset, and a subsequent control signal will again trip the circuit breaker in the manner described above.

Switching device 29, when energized, closes a switch contact 36 which is made available to initiate a control function dependent upon operation of the control relay. For example, by suitable connections to remote circuits, not shown, the closing of switch contact 36 may energize a visual operation indicator or target to indicate that the control relay is operating to trip circuit breaker 11. Device 29 could be provided with a plurality of switch contacts similar to contact 36 for initiating other auxiliary control operations. Device 29 can also be used to operate mechanically a suitable operation indicator or target, not shown. Switching device 35, which is energized in response to operation of seal-in device 29, is provided with a switch contact 37. This contact is made available to initiate a control function dependent upon operation of seal-in device 29, which operation assures that trip coil 14 is energized. For example, by suitable connections to remote circuits, not shown, switch contact 37 may cause the control signal supplied by source 17 to be discontinued.

The illustrated embodiment of the electronic control relay has been found by test to require less than .0003 second to energize trip coil 14 in response to a high frequency alternating voltage control signal from source 17.

While I have shown and described a preferred form of my invention by way of illustration, many modifications will occur to those skilled in the art. I, therefore, contemplate by the appended claims to cover all such modifications as fall within the true spirit and scope of my invention.

What I claim as new and desire to secure by Letters Patents of the United States is:

1. A control circuit for an electroresponsively tripped circuit breaker comprising, a gaseous discharge type electric valve including biasing means rendering said valve normally non-conductive, a pair of alternating voltage supply terminals, means responsive to energization of said terminals for deriving a unidirectional signal voltage and supplying said signal voltage to said valve, said valve being responsive to greater than a predetermined magnitude of said signal voltage to start conduction, electroresponsive means energized in response to conduction by said valve to initiate tripping operation of said circuit breaker, a first electromagnetic switching device operable in response to conduction by said valve to render said valve non-conductive while maintaining said electroresponsive means energized and to initiate a first control operation, and a second electromagnetic switching device responsive to operation of said first device to initiate a second control operation.

2. A control circuit for an electroresponsive device comprising, a gaseous discharge type electric valve having an anode, a cathode, a control grid and a shield grid, first and second sources of direct voltage, means connecting said first source between said shield grid and cathode to form a bias circuit, said first source of direct voltage being poled to establish a negative potential on said shield grid with respect to said cathode thereby rendering said valve non-conductive, means supplying said control grid with direct voltage of positive polarity and sufficient magnitude with respect to said cathode to initiate conduction by said valve, first and second electromagnetic switching means, and a controlled circuit including said second source of direct voltage, said first switching means and the electroresponsive device connected to said anode and cathode, whereby said device and said first switching means are energized in response to conduction by said valve, said first switching means being operable when energized to complete a shunt circuit between said anode and cathode while maintaining said electroresponsive device and said first switching device energized, said second switching means being connected in said shunt circuit and operable when energized to initiate a predetermined control operation.

3. A control circuit for an electroresponsively tripped circuit breaker comprising, a gaseous discharge type electric valve including biasing means rendering said valve normally non-conductive, a pair of alternating voltage supply terminals, means responsive to energization of said terminals for deriving a unidirectional signal voltage and supplying said signal voltage to said valve, said valve being responsive to greater than a predetermined magnitude of said signal voltage to start conduction, electroresponsive means connected to said valve and energized in response to conduction by said valve to initiate tripping operation of said circuit breaker, and an electromagnetic switching device connected to said valve and operable in response to conduction by said valve to render said valve non-conductive while maintaining said electroresponsive means energized and to initiate a predetermined control operation.

References Cited in the file of this patent

UNITED STATES PATENTS

| | | |
|---|---|---|
| 2,267,884 | Zuschlag | Dec. 30, 1941 |
| 2,541,879 | Martin | July 18, 1944 |
| 2,707,250 | Hoover | Apr. 26, 1955 |

OTHER REFERENCES

Radio and TV News, May 1951, p. 57.